March 9, 1926.
H. H. JACKSON
CLUTCH MECHANISM
Filed August 11, 1924
1,576,190
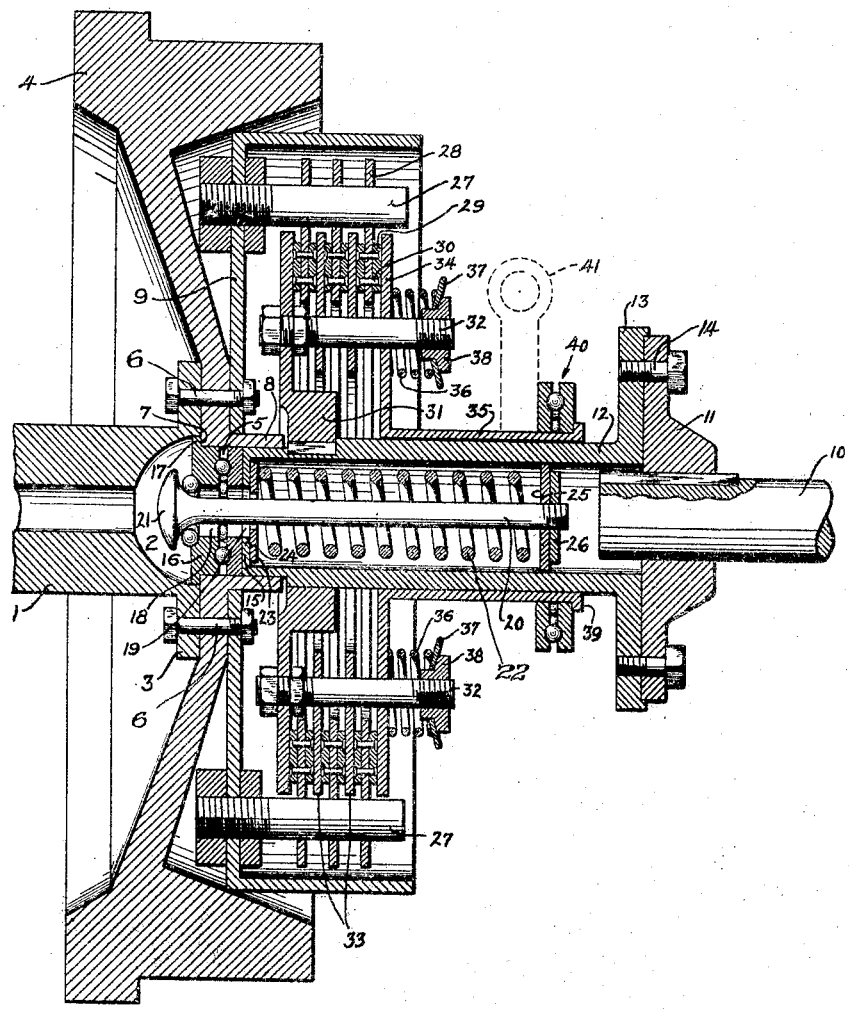
INVENTORS.
HARRY H. JACKSON
BY
Joseph Dugan
ATTORNEY.

Patented Mar. 9, 1926.

1,576,190

UNITED STATES PATENT OFFICE.

HARRY H. JACKSON, OF LOS ANGELES, CALIFORNIA, ASSIGNOR OF ONE-FOURTH TO JAMES V. BALDWIN, ONE-FOURTH TO ANDREW E. BALDWIN, AND ONE-FOURTH TO BERNARD H. SONNTAG, ALL OF LOS ANGELES, CALIFORNIA.

CLUTCH MECHANISM.

Application filed August 11, 1924. Serial No. 731,337.

*To all whom it may concern:*

Be it known that I, HARRY H. JACKSON, citizen of the United States, residing at Los Angeles, in the county of Los Angeles and State of Cailfornia, have invented new and useful Improvements in Clutch Mechanism, of which the following is a specification.

This invention relates to clutch mechanism of the friction type designed for use on motor vehicles and in other applications where conditions require or render desirable the use of clutches of this type.

The general object of the invention is to provide clutch mechanism of the disk type designed to form a unit adapted to be substituted for the well-known cone clutch mechanisms in common use on motor vehicles, and to convert such cone clutch mechanisms into similar mechanisms of the disk type.

It is also an object, in effecting such substitution, to retain all the parts of the old cone clutch mechanism that can be utilized efficiently to cooperate with the substituted elements of the disk clutch mechanism, in order to keep the cost of changing from one type of clutch to another as low as possible.

Another object of the invention is to simplify the construction of the disk clutch mechanism referred to, and to shape and arrange the parts thereof so as to adapt them for quick and easy assembling and disassembling when repairing, or when changing from one type of clutch to another.

Other objects will appear from the following description taken in connection with the drawing which forms a part of this specification, and in which:—

The figure is a longitudinal vertical section, taken centrally through a clutch mechanism embodying this invention.

The drive shaft 1 is provided at the clutch end with a flange 3 and a cup-like recess 2 in the end of the shaft. A fly wheel 4, provided with a circular opening 5 somewhat smaller in diameter than the diameter of the opening or recess 2, is suitably secured to said shaft 1, as by bolts 6, with the periphery of said opening 5 projecting into and forming a circular shoulder 7 in said recess 2. A hub 8 projects from the center of the fly wheel 4 and serves to seat a cup-shaped disk 9, which may also be secured to the fly wheel 4 by means of the bolts 6, as shown.

The driven shaft 10 has keyed to turn therewith and to slide thereon, a member 11 to which one end 13 of a hollow cylindrical coupling 12 is secured, as by bolts 14. This coupling 12, which serves to connect the driving shaft 1 and the driven shaft 10, has its other end 15 slidably seated in the hub 8 of the fly wheel 4. A ball bearing 16 also extends into said hub 8 and is seated in said recess 2 with a shoulder 17 in contact with a shoulder 7 formed by the part of fly wheel 4 projecting into recess 2. This bearing 16 is provided with an opening 18 alining with a similar opening 19 through the end of coupling 12.

The coupling 12 and bearing 16 are held yieldingly toward each other by means of a plunger 20 having a head 21 seated in recess 2, against bearing 16, and by a spring 22 which impinges at one end against a washer 23 bearing against an internal flange 24 on coupling 12 and at its other end impinges against a head 25 secured on the end of plunger 20 as by nut 26. This construction provides for the relative rotation of the driving shaft 1 with the fly wheel and mechanism carried thereby and the other mechanism connected to rotate with the driven shaft 10.

The cup-shaped disk 9 has a plurality of pins 27 extending therefrom and on which clutch rings 28 are arranged to slide, friction plates 29 being suitably secured on opposite sides thereof by means of bolts or rivets 30.

A supporting plate 31 is fixed to coupling 12, and has projecting therefrom a plurality of pins 32 on which are slidably mounted friction disks 33, each of which is arranged between two of the friction plates 29. A plate 34, also slidable on said pins 32, is provided with a cylindrical sleeve arranged to slide on coupling 12. The plate 34 serves also as a friction disk, and normally is used to maintain the friction plates 29 and disks 33 in operative contact, by the pressure of springs 36 mounted on pins 32 and extending between said plate 34 and heads 37 secured by nuts 38 on the ends of pins 32.

The sleeve 35 has a shoulder 39 formed thereon to seat a thrust ball bearing ring 40 adapted to be engaged by a clutch releasing lever 41.

It will be apparent from the drawing that in the change over from cone to disk clutch, the fly wheel of the cone clutch mechanism is retained. The conical recess thereof serves as a seat for the disk mechanism, and its periphery serves somewhat as a protecting casing for the mechanism seated therein.

The coupling slidably connecting the driving and driven shafts provides for quick and easy separation of the elements of the clutch mechanism, and renders all the parts immediately accessible for either removal or insertion. When the clutch releasing lever 41 is operated in the usual way, the bearing ring 40 thrusts the sleeve 35 with its plate 34 rearwardly toward the driven shaft, thereby releasing the pressure between the friction plates and disks, which are mounted to slide freely on their respective supporting pins 27 and 32. No particular means is used to separate said plates and disks, as it is found in actual use that they separate sufficiently of themselves, when pressure is relieved, to break driving connection between the driving and driven shafts.

The flange on the cup-shaped disk member is also of great importance, since it serves both as a strengthening member and as a casing for the disk mechanism.

Having described my invention, what I claim and desire to secure by Letters Patent is:—

1. In clutch mechanism, in combination, a driving shaft having a recess in the end thereof, a fly wheel secured to said shaft and having a part extending over said recess to form a peripheral shoulder, a bearing seated in said recess against said shoulder, a coupling extending from and slidably connected to said fly wheel, and means for holding said coupling in yielding contact against said bearing.

2. In clutch mechanism, in combination, a driving shaft, a driven shaft, a coupling slidably connected to said driven shaft, means for yieldingly connecting said coupling to the driving shaft, a fly wheel having a recess therein and secured to said driving shaft, a cup shaped support mounted in said recess, friction plates slidably mounted in said support, disks slidably mounted on said coupling, and means for pressing said plates and disks into yielding frictional contact with each other.

3. In clutch mechanism, in combination, a driving shaft having a recess in its end, a fly wheel secured to said end and having a hub portion partly projecting over said recess to form an annular shoulder therein, a driven shaft, a coupling secured at one end to said driven shaft and having its other end slidably mounted in said hub portion, and yielding means for slidably and rotatably securing said other end in said hub portion.

4. The mechanism set forth in claim 3, in combination with clutch mechanism having part thereof secured to said fly wheel and other parts cooperating therewith mounted on said coupling.

5. The mechanism set forth in claim 3, in combination with a support secured to said fly wheel, friction plates slidably mounted on said support, a second support fixed to said coupling, disks slidable on said second support, and each arranged between two of said friction plates, a plate slidably mounted on said coupling, and means for causing said plate to force said friction plates and disks into frictional contact with each other.

6. In clutch mechanism, in combination, a driving shaft having a recess at one end thereof, means secured to said end and projecting partly over said recess to form a shoulder therein, a driven shaft, a hollow cylindrical coupling provided at one end with an internal flange, and having its other end secured to said driven shaft, a thrust bearing seated in said recess and against said shoulder, a rod having a head in contact with said bearing and a shank passing through said bearing and into said coupling, a head secured to said shank and slidable in said coupling, and a spring arranged in said coupling between the last named head and said flange to hold said bearing and said coupling in yielding contact.

7. The mechanism set forth in claim 3, in combination with a support secured to said fly wheel, friction plates slidably mounted on said support, a second support fixed to said coupling, disks slidable on said second support, and each arranged between two of said friction plates, a plate slidably mounted on said coupling, means for causing said plate to force said friction plates and disks into frictional contact with each other, and means for slidably connecting said coupling with said driven shaft.

8. In clutch mechanism, a driving shaft, a driven shaft, a cone clutch fly wheel secured to said driving shaft, and disc clutch mechanism interposed between said fly wheel and said driven shaft and having one end thereof fixed to said fly wheel.

9. In clutch mechanism, a driving shaft, a driven shaft, a cone clutch fly wheel secured to one end of said driving shaft, a coupling having one end connected to said driven shaft to rotate therewith and having its other end rotatably connected to said fly wheel, a support secured to said fly wheel, friction plates slidably mounted thereon, friction disks mounted between said plates, and means slidable on said coupling for forcing said plates and disks into frictional locking contact with each other to cause said coupling and driven shaft to rotate with said fly wheel and driving shaft.

10. In combination with a fly-wheel having a cone clutch socket therein, a disc clutch comprising a member secured to the wheel adjacent the socket, a central hub, a plurality of discs, certain of the discs being non-rotatably connected to the member, and certain to the hub, and spring means normally holding the discs in face-to-face contact.

11. In combination with a fly-wheel having a cone clutch socket therein, a disc clutch comprising a member secured to the wheel adjacent the socket, a pair of discs connected non-rotatably to the member, a central hub, a disc non-rotatably mounted on the hub and located between the first said discs, and spring means normally holding the said pair of discs in contact with the other disc.

12. In combination with a fly-wheel having a cone clutch socket therein, a disc clutch comprising a member secured to the wheel at the bottom of the socket, a plurality of discs connected non-rotatably to the member within the socket, a central hub, a plurality of discs non-rotatably mounted on the hub and located alternately between the first mentioned discs, and spring means normally holding the discs in face-to-face contact.

13. In an automobile the combination of an engine shaft having a fly-wheel receiving end; a fly wheel therefor, said fly wheel having a hub and a web with bolt holes; a clutch plate member mounted over said hub; bolts securing said fly wheel, engine shaft and said clutch plate member together; a hollow clutch shaft slidably mounted in said hub, said shaft being arranged to be splined to a propeller shaft; a spring within said shaft tending to hold the latter in its inner position in said hub; and clutch discs secured to said clutch shaft.

In testimony whereof, I have signed my name to this specification.

HARRY H. JACKSON.